United States Patent [19]

Watson, Jr.

[11] 3,970,203

[45] July 20, 1976

[54] COMBINATION TRAILER

[76] Inventor: Wilson D. Watson, Jr., 3112 W. Illinois, Midland, Tex. 79701

[22] Filed: Apr. 28, 1975

[21] Appl. No.: 572,150

[52] U.S. Cl. ............................ 214/85.1; 280/414 R; 296/1 A
[51] Int. Cl.² .......................................... B60P 3/08
[58] Field of Search .................. 280/414 R, 414 B; 296/1 A, 23 B; 214/85, 85.1

[56] References Cited
UNITED STATES PATENTS

| | | | |
|---|---|---|---|
| 2,636,772 | 4/1953 | Bridge | 296/1 A |
| 3,677,425 | 9/1972 | Patten | 296/1 A |
| 3,866,772 | 2/1975 | Gardner | 296/23 B |
| 3,870,339 | 3/1975 | Goff | 280/414 R |

Primary Examiner—M. H. Wood, Jr.
Assistant Examiner—John A. Pekar
Attorney, Agent, or Firm—Wendell Coffee

[57] ABSTRACT

A low-slung boat trailer is provided with a swinging back gate and swinging crossbeam above the boat when loaded on the trailer so that a camper trailer may be loaded above the boat by an electric winch; and the boat trailer still used for launching and retrieving a boat.

9 Claims, 4 Drawing Figures

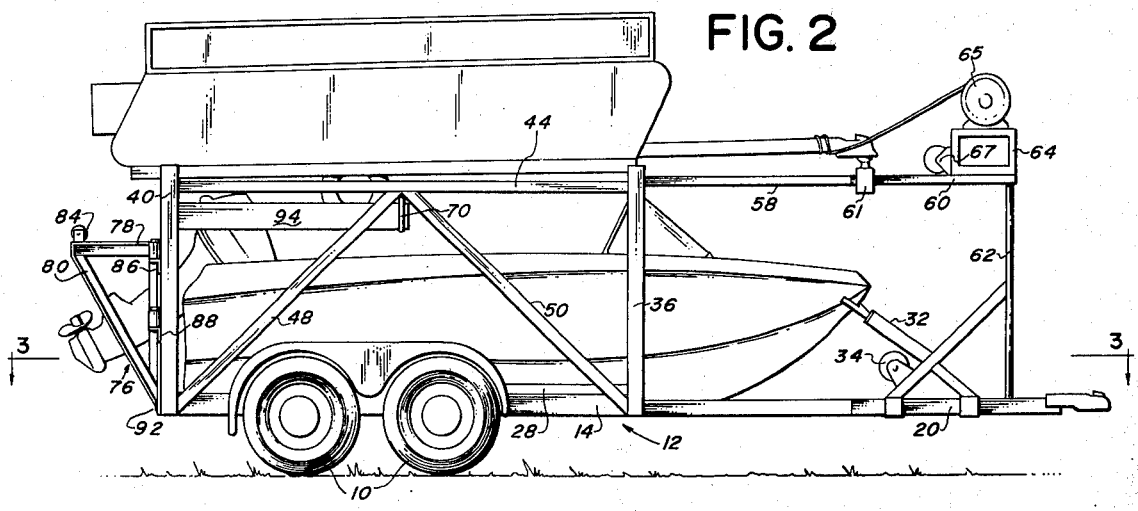
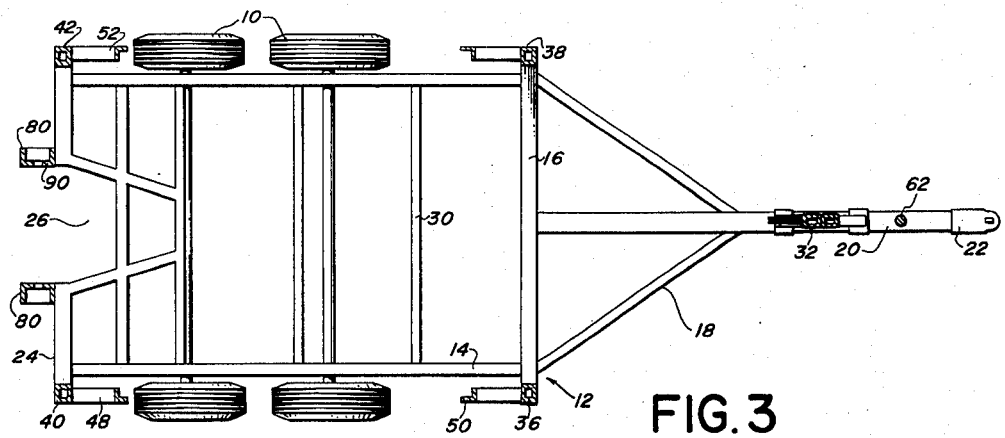
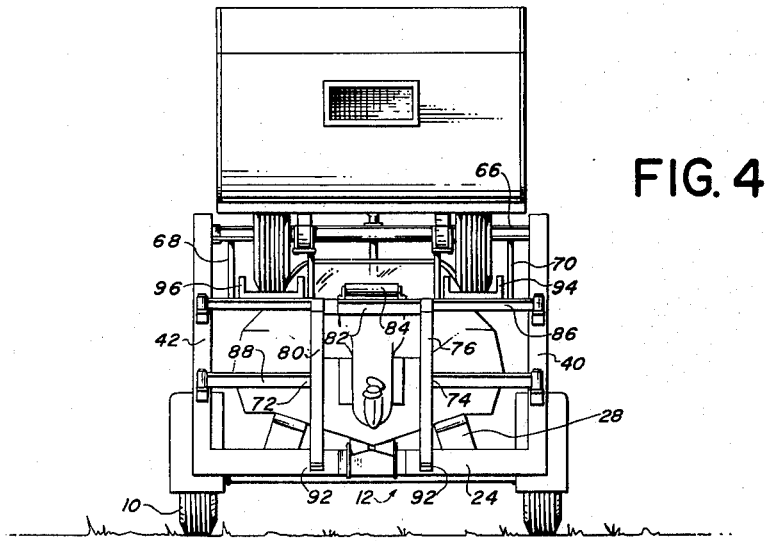

COMBINATION TRAILER

BACKGROUND OF THE INVENTION:

1. Field of the Invention

This invention relates to land vehicles for carrying boats and other land vehicles.

2. Description of the Prior Art

In the United States today, boats are commonly carried and stored on trailers. These trailers are customarily backed into the water and the boats launched and retrieved onto the trailers for storage. This is convenient when a family goes for a one-day outing. However, if a family desires to camp over night also, there is a problem of carrying their camping equipment as well as the boat. This is particularly acute if they use a type of camper having a tent folded within a vehicle. Previous workers have suggested carrying such vehicles in tandem or have suggested other solutions. The following U.S. patents show previously suggested solutions to the problem or to similar problems: GILE ET Al., No. 2,881,023; LARSEN, No. 2,998,150; BLEDSOE, No. 3,556,582; BLACK, No. 3,568,866; PATTEN, No. 3,677,425; SWIFT, No. 3,718,227, and ALEXANDER ET Al., No. 3,751,073.

SUMMARY OF THE INVENTION:

1. New and Different Function

I have invented a device where the camping trailer may be carried over the boat. I have solved the problem of launching the boat by providing a swinging back gate and a swinging top beam so the boat may be launched and retrieved upon the trailer after the camper has been unloaded.

2. Objects of this Invention

An object of this invention is to provide means for transporting a camper and a boat on a single trailer.

Other objects are to achieve the above with a device that is sturdy, compact, durable, lightweight, simple, safe, efficient, versatile, and reliable, yet inexpensive and easy to manufacture, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 2 is a side elevational view of the trailer with the boat and camper loaded thereon.

FIG. 3 is a top sectional view of the trailer without the boat, taken substantially on line 3—3 of FIG. 2 with the same parts not shown for clarity.

FIG. 4 is a rear elevational view of the trailer with the boat and camper loaded thereon.

DESCRIPTION OF THE PREFERRED EMBODIMENT

Figure 1:
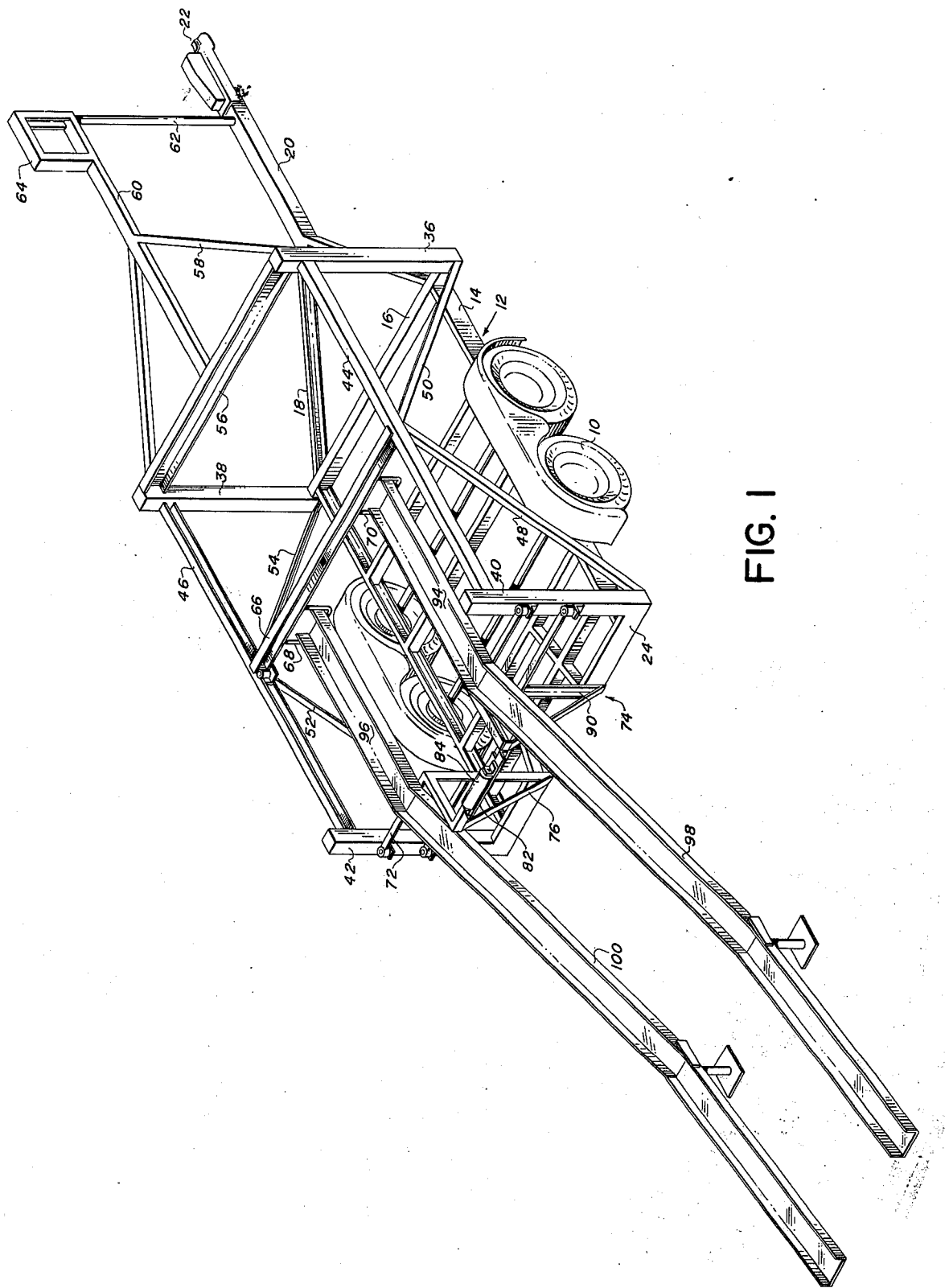
FIG. 1 is a perspective view of the main structural portions of the trailer with the ramp shown in position to load the camper.

Referring to the drawings, there may be seen that the trailer includes a running gear having tandem axles and tandem wheels 10. The wheels are attached to main frame or lower frame 12 by suitable springs, shock absorbers and the like. It will be noted that the top of the lower frame is below the top of the wheels 10. The lower frame, basically, has a rectangular portion which includes stringers 14 extending along the outside edge of the main rectangular portion of the lower frame 12. The stringers extend about as far forward of the running gear as they do behind; therefore, this portion of the frame is basically centered over the running gear. Forward crossbeam 16 extends across the stringers 14 at the forward portion thereof and extends outboard thereof so the ends of the forward crossbar terminates in front of the wheels 10. From there is connected V-shaped nose portion 18. Tongue 20 extends from forward socket 22 to the V-shaped nose and to the forward crossbar 16. The socket 22 forms a means for hitching the trailer to a towing vehicle which is the automobile.

Aft crossbar 24 is interrupted or has gap 26 in the center thereof. This gap forms a motor opening for the motor and propeller of the boat when the boat is mounted upon cradles 28. Three or four intermediate crossbars 30 extend between the stringers 14, between the forward crossbar 16 and aft crossbar 24. The aft crossbar also extends outboard of the stringers 14 so that it is in line with the termination of the ends of the forward crossbar 16 which is to say that it is in line with the wheels 10 of the running gear. Winch stand 32 with winch 34 is mounted upon the forward apex of the V-shaped nose 18. It may be seen that these may be used to pull the boat upon the trailer and with the boat on the trailer, the bottom of the boat is below the top of the wheels 10, thus keeping the center of gravity of the vehicle as low as possible when loaded.

Inasmuch as the attachment of cradles to a boat trailer frame is well known to the art, they have not been specifically described here.

Forward right stanchion 36 extends vertically upward from right terminal of the forward crossbar 16. Forward left stanchion 38 extends vertically upward from the left terminal of the forward crossbar 16. The aft right stanchion 40 extends vertically upward from the right terminal of the aft crossbar 24 and aft left stanchion 42 extends vertically upward from the left terminal of aft crossbar 24. Right side rail 44 extends from the forward right stanchion 36 to the aft right stanchion 40 and left side rail 46 extends from the left forward stanchion 38 to the left aft stanchion 42. Aft right brace 48 is attached from the bottom of the aft right stanchion 40 to the middle of the right side rail 44. Forward right brace 50 extends from the bottom of the forward right stanchion 36 to the middle of the right side rail 44. Aft left brace 52 extends from the bottom of the aft left stanchion 42 to the middle of the left side rail 46 and forward left brace 54 extends from the bottom of the forward left stanchion 38 to the middle of the left side rail 46. Upper crossbeam 56 extends between the tops of the forward stanchions 36 and 38. Upper V-shaped nose 58 is attached from the top of the forward stanchions forward and false tongue 60 extends from the center of the upper crossbeam 56 forward. The forward end of the upper false tongue 60 is braced by tongue stanchion 62 extending down to the tongue 20. Winch bracket 64 on the top of the forward false tongue 60 carries electric winch 65 thereon. Upper hand winch 67 is on the false tongue at the base of the bracket 64.

The structure of the trailer and frame and the elements thereof are all rigidly and securely attached together as known in the art. The attachments may either be by bolting or riveting or welding. Under modern construction techniques, welding is preferred. Swingbeam 66 is hinged to the left side rail 46 at the midpoint thereof, i.e., at the connection of the braces 52 and 54. The swingbeam 66 is hinged about a vertical pivot so it swings in a horizontal plane. The right side of the swingbeam 66 is latched to the right side rail 44 at the midpoint, i.e., the connection of the right braces 48 and 50. Left track bracket 68 and right track bracket 70 depend from the swingbeam 66.

Left rear gate 72 is hinged to the left aft stanchion 42 and right rear gate 74 is hinged to the right aft stanchion 40. Each of the gates 72 and 74 have a rearwardly extending bracket 76. The bracket has a horizontal rearward extending member 78 and angle brace 80. The tops of the two angle braces 80 are connected by roller bar 82 which carries roller 84 on the top of it. The gates each have an upper hinge bar 86 extending from a hinge on the stanchion to the forward portion of the top member 78 and lower hinge bar 88 extends to an intermediate point on vertical member 90, the vertical member 90 extending from the forward portion of the top member 78 to the bottom of the angle brace 80. The roller bar 82 is bolted to the brackets so that upon unbolting or unpinning the gates may be opened and upon pinning they are closed. The bottom of each gate rides upon clip 92 which is attached to the aft crossbar 24 immediately adjacent the gap 26.

The upper hinge bar 86 is lower in elevation than the track brackets 68 and 70; therefore, right track 94 extends from the top of the right rear aft gate 76 to the right track bracket 70 and left track 96 extends from the top of the left gate 72 to the left track bracket 68. Right ramp 98 extends from the top of the right gate and the right track 94 rearwardly and left ramp 100 extends from the top of the left gate and the left track 96 rearwardly.

With the boat on the cradle, the camper trailer is loaded upon the trailer with the trailer rig as shown in FIG. 1 by extending the cable from the electric winch 65 to the camper trailer and the camper trailer winched up the ramps 98 and 100 to the tracks 94 and 96. The roller 84 protects the boat motor from the camper tongue. When the camper is in position, the rear of the camper may be secured in place by chains, boomers, or other expedients that are well known in cargo handling. The hitch socket upon the forward portion of the camper is secured to ball 61 upon the false tongue 60. The ramps 98 and 100 are then removed and mounted upon the vehicle and the loaded vehicle is ready for travel.

To unload the camper, basically, the reverse procedure is followed. It will be noted that the roller 84 also protects the boat motor from damage by the cable of the electric winch 65. The hand winch 67 is used to start the camper down the ramps. Specifically, the line from the hand winch 67 is extended to a block (not shown) on the swing beam 66 and from there to the camper tongue. Thus, the camper is moved rearwardly until the camper wheels are on the ramps 98 and 100. After the camper has been unloaded by rolling it down the ramps 98 and 100, the ramps are removed and set beside the camper and the tracks 94 and 96 are removed and set beside the camper. The right end of the swingbeam 66 is unlatched and the swingbeam 66 swung to a position next to the left side rail 46. The roller bar 82 is unbolted from one or both gates 72 and 74 and the gates swung open. In this condition, the boat may be launched by backing the trailer into the water and floating the boat free of the trailer. The boat may be loaded onto the trailer by reverse procedure.

For those people who have a towing vehicle with a mounted winch, the electric winch 65 on the trailer can be eliminated and a cable sheave inserted in its place. The towing vehicle winch cable then can be strung from the vehicle over the sheave (where the electric winch was) and then over the top of the trailer to the camper. This arrangement would afford a considerable saving to the potential owner if he has this kind of winch on his vehicle.

Thus, it may be seen that I have provided a vehicle readily adapted to carry both a boat and camper so that both can be readily loaded and unloaded therefrom.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. A trailer comprising:
   a. a tandem running gear including ground engaging wheels,
   b. a frame mounted on said running gear, said frame having
      i. a rectangular portion approximately centered over said running gear, and
      ii. a V-nose portion extending forward,
   c. the frame positioned below the top of the ground engaging wheels of the running gear,
   cd. the frame having a motor cut-out in the rear thereof,
   d. a boat cradle mounted on said frame,
   e. a boat in said cradle,
   f. the bottom of said boat below the top of the wheels of the running gear,
   g. a winch located at the apex of the V-nose,
   h. said boat attached to the forward portion by said winch,
   j. four upward-extending stanchions at each of the corners of said rectangular portion of the frame,
   k. said stanchions located outward of said frame so the width of the frame at the stanchions is approximately equal to the width of the running gear at the wheels,
   m. side rails on each side of the vehicle attached at the top of the stanchions,
   n. a crossbar connecting the two front stanchions thereby forming a U-shaped opening,
   o. a V-nose on the front of the upper portion extending from the two front stanchions forward,
   p. an electrical winch on the upper V-nose,
   q. rear braces extending from the bottom of the rear stanchion to the midpoint of the side rail,
   r. forward brace extending from the bottom of the front stanchion to midpoint of the side rail,
   s. a middle crossbeam hinged to the side rail where two braces meet on one side,
   t. said mid-crossbeam latched to the side rail on the other side where two braces meet,
   u. a right back gate hinged to the right rear stanchion,
   v. a left back gate hinged to the left rear stanchion,
   w. each of said gates extending to the edge of the motor cut-out, x. each of said gates extending rearwardly at the edge of the cut-outs,
y. the top of said two gates connected with a rear gate bar,
z. a roller on the top of the rear gate bar,
aa. the mid-crossbeam having a bracket on each side,
bb. a track extending from each bracket to said rear gate,
dd. a camper having wheels thereon,
ee. the wheels of the camper vehicle in the track, and
ff. a pair of ramps carried by the frame and adapted to be attached to said gates, each lined up with the track so the camper can be rolled by the electric winch on the front of the upper frame up and down the ramp.

2. The invention as defined in claim 1 with an additional limitation of
gg. a hand winch on the upper V-nose for starting the camper when unloading.

3. In a trailer having
a. ground engaging wheels,
b. a lower frame to which the wheels are journaled,
c. said frame being lower than the top of said wheels,
d. cradle means on said frame for carrying a boat thereon so that the lower portion of the boat is also carried below the top of the wheels,
e. the improved structure for carrying a camper on said frame comprising:
f. a second frame,
g. said second frame lying in a horizontal plane generally parallel to said first frame,
h. stanchions supporting said second frame from said first frame,
i. said second frame having side rails extending along each side,
j. track members on said second frame,
k. said track members adaptable to support the wheels of a camper thereon,
l. said track members supported by and extending from a middle beam to a rear gate,
m. said middle beam pivoted at one side to the side rail,
n. said back gate pivoted on each side to a stanchion supporting said side rail,
o. said back gate bolted closed,
p. ramp means carried on said trailer so that said ramp means may be attached to said back gate to roll the camper up and down the ramp onto the tracks of the upper frame, and, also, so that said middle beam and back gates may be opened for loading and unloading a boat upon the boat cradles.

4. The invention as defined in claim 3 with additional limitations of
q. a boat on the boat trailer, and
r. a camper on the tracks.

5. The invention as defined in claim 3 with an additional limitation of
q. an electrical winch mounted on said upper frame at the forward most portion thereof.

6. The invention as defined in claim 5 with additional limitations of
r. a boat on the boat trailer, and
s. a camper on the tracks.

7. The invention as defined in claim 3 wherein the lower frame includes
q. a rectangular portion approximately centered over said running gear and a V-nose portion extending forward,
r. a winch located at the apex of the V-nose, and
s. said stanchions are specifically four upwardextending stanchions at each of the corners of said rectangular portion of the frame,
t. said stanchions located outward of said frame so the width of the frame at the stanchions is approximately equal to the width of the running gear at the wheels,
u. a crossbar connecting the two front stanchions thereby forming a U-shaped opening,
v. a V-nose on the front of the upper portion extending from the two front stanchions forward,
w. an electrical winch on the upper V-nose,
x. rear braces extending from the bottom of each rear stanchion to the midpoint of each side rail,
y. forward braces extending from the bottom of each front stanchion to midpoint of each side rail, and
z. said mid-crossbeam latched to the side rail on the other side where two braces meet.

8. The invention as defined in claim 7 with an additional limitation of
aa. an electrical winch mounted on said upper frame at the forward most portion thereof.

9. The invention as defined in claim 8 with additional limitations of
bb. a boat on the boat trailer, and
cc. a camper on the tracks.

* * * * *